Aug. 31, 1937.            R. HORTON            2,091,780
CHAIN PIN EXTRACTOR
Filed Nov. 5, 1936
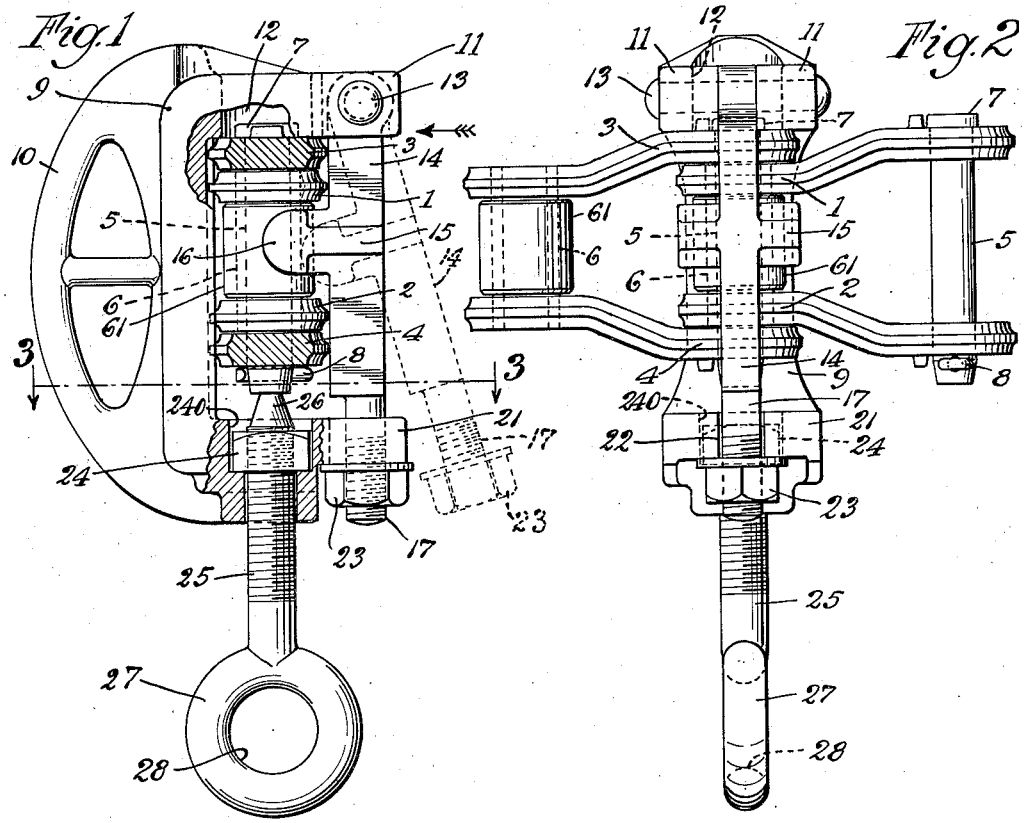
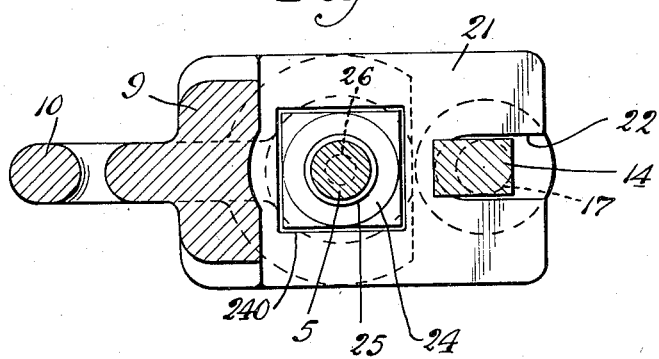
Inventor
Robert Horton
by Parker Carter
Attorneys.

Patented Aug. 31, 1937

2,091,780

UNITED STATES PATENT OFFICE 2,091,780

CHAIN PIN EXTRACTOR

Robert Horton, Houston, Tex., assignor to Link-Belt Company, Chicago, Ill., a corporation of Illinois Application November 5, 1936, Serial No. 109,300

1 Claim. (Cl. 29—86.1)

My invention relates to pintle pin extracting and seating devices for chains and the like and has for one object to provide a new and improved portable tool which may be used to repair and assemble transmission chain in the field. The invention is especially applicable for use in connection with servicing steel chains used in oil well drilling rigs and the like. The chain habitually comprises a series of pairs of links sometimes separate and sometimes joined together. Between each pair of links is ordinarily a bushing, a roller and a single pintle pin passing through them and joining one pair of side bar links to another pair of side bar links. These pintle pins must fit very tightly in the links and are seated in the chain under very heavy pressure. When it is desired to disassemble the chain or take out one or more pintle pins in the field, that has heretofore been done by use of a sledge or heavy hammer and this process is hazardous and difficult and may result in damage to some of the attendants.

My invention comprises a jaw member which may be placed about the chain over the pintle pin provided with a screw or other power multiplying device for applying power pressure on the pintle pin to force it out of the chain links.

Other objects of my invention will appear from time to time throughout the specification and claim.

My invention is illustrated more or less diagrammatically in the accompanying drawing, wherein—

Figure 1 is a side elevation of the device showing a chain in section;

Figure 2 is a side elevation of the device in Figure 1 looking in the direction of the arrow;

Figure 3 is a section along the line 3—3 of Figure 1.

Like parts are indicated by like symbols throughout the specification and drawing.

The drive chain comprises pairs of link ends 1, 2; and 3, 4. They are apertured to engage a pintle pin 5. Connecting the inner link ends 1, 2, is a bushing 6, usually encircled by a roller 61. The pintle pin 5, has at one end a head 7, at the other end a cotter 8. The chain is made up of a series of links, pins and rollers. The roller is, of course, free to rotate on the bushing. The inner link ends 1 and 2 are assembled under heavy pressure and prevented from rotating up the bushing and the outer link ends 3, 4 are held against rotation with respect to the pin, by the drive fit of the pin in the link ends 3 and 4. Rotation takes place between one pair of link ends 1 and 2 and their bushing with respect to the pair of link ends 3 and 4 of connecting pairs of links by movement between the pin connecting the two pairs of links and the bushing overlying the pins.

9 is a clamp body adapted to extend in parallelism with the pintle axis. For convenience in manipulation, it has a handle 10 on the side, opposed to the chain. The clamp body has an integral bifurcated fixed arm 11, extending at right angles therefrom, apertured at 12 and supporting a hinge pin 13, on which is pivoted the tie rod 14. The tie rod 14 has an inwardly extending lug 15, forked at 16 to provide jaws to engage and center the roller 61 or if the roller is omitted to engage the bushing 6. The lower end of the tie rod 14 terminates in a threaded cylindrical shank 17.

At the lower end of the clamp body 9 and handle 10 is a supporting arm 21 integral therewith, extending in parallelism with the fixed arm 11. This arm is slotted at 22 so that the shank 17 may when it is swinging inwardly engage the roller 61 or bushing 6 or link barrel thereby properly positioning and holding the chain and pin in the clamp. 23 is a nut on the shank 17 adapted to hold the assembly together and to be tightened up so that the tension may be taken both by the body 9 and the tie rod 14. 24 is a nut socketed in an aperture 40 in the clamp arm 21. 25 is an extractor screwed into nut 24. The screw has a truncated conical driving end 26 adapted to engage an end of the chain pintle pin 5 and an expanded head 27 apertured at 28 so that a tool may be inserted to rotate the screw. The fact that the nut is loosely socketed in the clamping arm 21 makes it possible to start the loosening or unseating of a pintle pin in link ends 3 and 4 by hammering on the head 27 before or as the screw is rotated. The nut is held against rotation in the arm 21 but is free to move toward and from the pin so that there is no resistance to inward movement of the screw under the hammering effect except the resistance of the pintle pin itself.

In using the device illustrated, the shank 17 and the clamping arm 21 are swung out of engagement with one another even further apart than shown in dotted lines. The clamp is then placed upon the chain and the clamping arm and shank are brought together into the position shown in full lines and the nut is drawn up until the extractor screw is in line with the chain pintle pin with the centering jaws resting upon the roller. Then a tool is placed in the apertured head of the extractor screw and the head is rotated to exert a pressure on the chain pintle pin tending to unseat it. If the pin is frozen in place, it may sometimes be necessary to hammer on the end of the screw as the screw is being rotated. The power is sufficient under ordinary circumstances to unseat and push the pintle pin out of the chain. In fact, the power is so great that in actual practice frequently the pintle pin is forced out without even bothering to remove the cotter pin, the cotter pin being sheared off as the pintle pin is forced out. It will be understood that the tightness of the fit is at the end of the inward movement of the pintle pin so that a comparatively slight longitudinal displacement of the pintle pin is sufficient to unseat it when it may be withdrawn by hand.

The tool may also be used to seat a pin. The pin is inserted almost to the end of its travel as it enters the link and roller assembly before any pressure is needed. Pressure is then applied to seat it just as indicated above to unseat it.

Ordinarily there will be a roller on the bushing and so in the claim I have referred to centering by engaging the roller. It will be understood, of course, that if the roller is omitted, the centering is applied to the bushing itself and in that connection, the use of the word "roller" in the claim is intended to cover both contact with the roller itself or contact with a bushing or other sprocket engaging member.

I claim:

A pin extractor for roller chains and the like comprising a body, spaced integral apertured arms projecting therefrom, a tension member connecting the free ends of said arms and removable to permit the device to encircle a chain, one arm adapted to engage the link of a chain with the pintle pin in line with the aperture, a nut held in the other arm against rotation, free to move toward the pintle pin of the chain but positively limited in movement away from it, a screw extending through the aperture in the arm, threaded in the nut and adapted to engage the end of the pintle pin, the screw being adapted to be simultaneously engaged by a tool to rotate it and by a tool to drive it and the nut in the direction of the pintle pin, the tension member comprising an elongated body having an eye at one end, threaded at the other, a hinge pin extending through the eye by which it is pivoted on one arm, the other arm being slotted for penetration by the threaded end and a nut adapted to engage the slotted arm.

ROBERT HORTON.